Nov. 10, 1959    S. HABSBURG-LOTHRINGEN ET AL    2,912,675
VEHICLE LAMP SYSTEM

Filed Jan. 17, 1956    4 Sheets-Sheet 1

INVENTORS
Stefan Habsburg Lothringen,
Clark Edward Quinn
BY
E. W. Christen
ATTORNEY

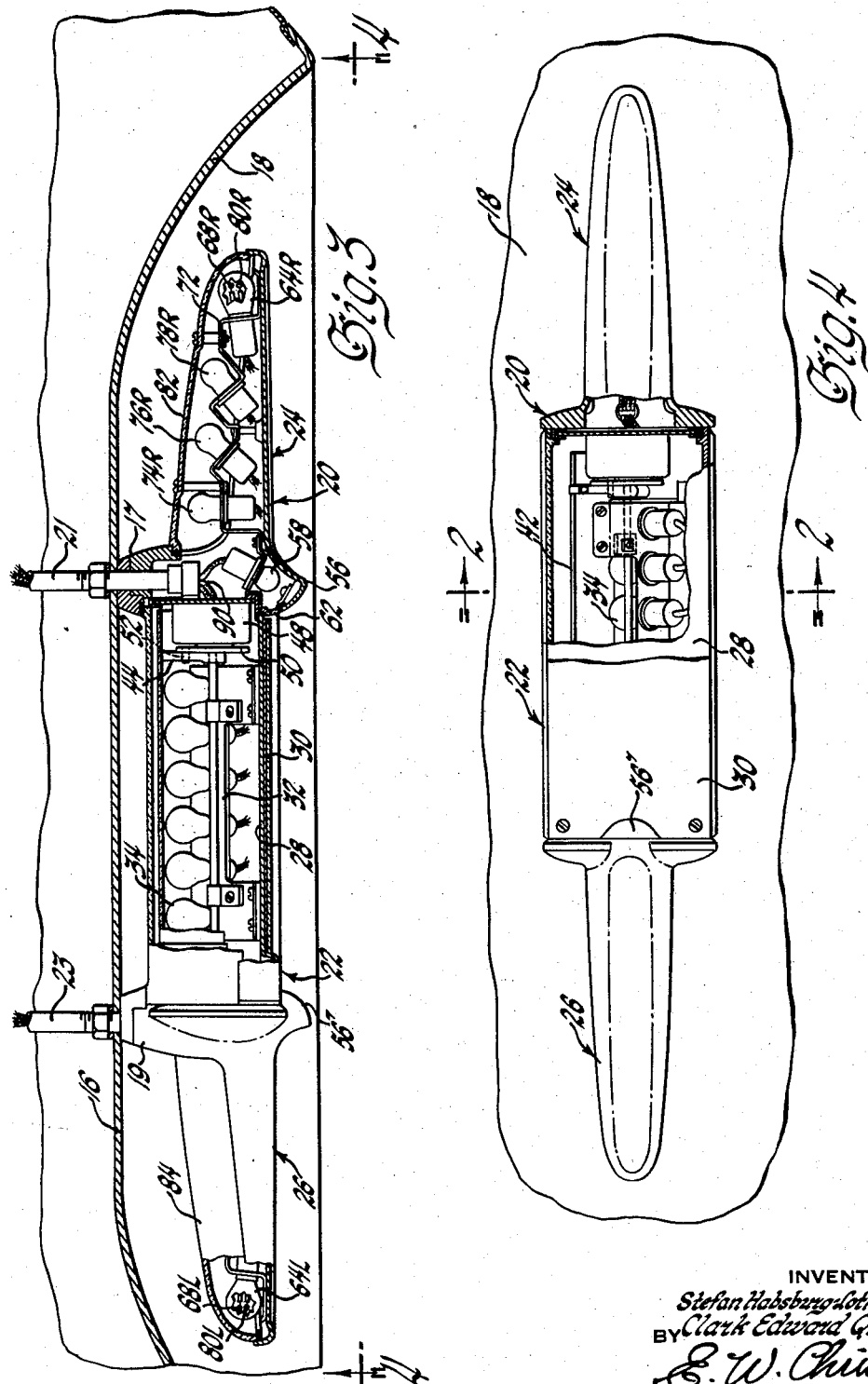

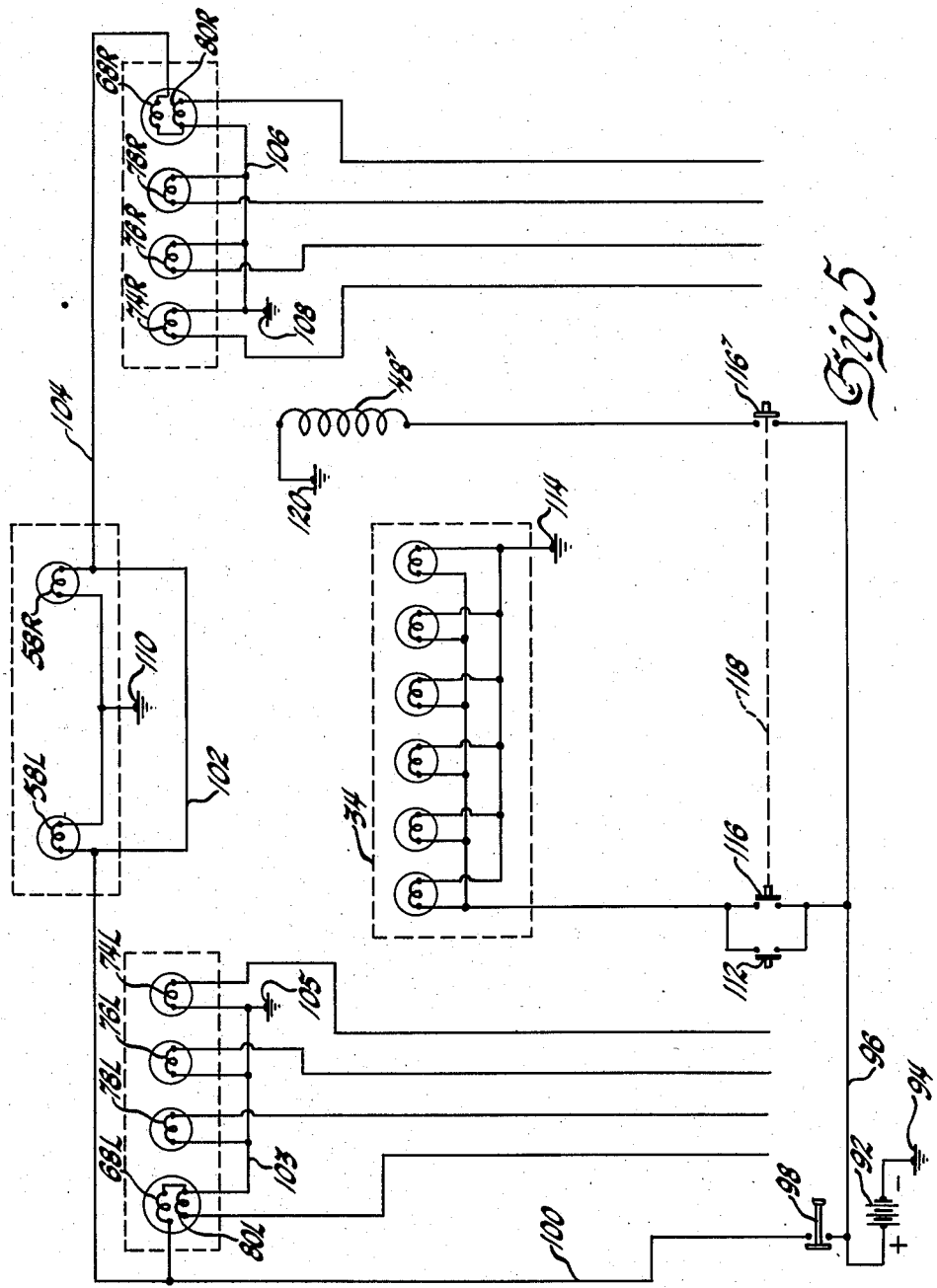

Nov. 10, 1959   S. HABSBURG-LOTHRINGEN ET AL   2,912,675
VEHICLE LAMP SYSTEM
Filed Jan. 17, 1956  4 Sheets-Sheet 4

INVENTORS
Stefan Habsburg Lothringen, S.
BY Clark Edward Quinn

E. W. Christen
ATTORNEY

United States Patent Office

2,912,675
Patented Nov. 10, 1959

2,912,675

VEHICLE LAMP SYSTEM

Stefan Habsburg-Lothringen and Clark Edward Quinn, Royal Oak, Mich., assignors to General Motors Corporation, Detroit, Mich., a corporation of Delaware Application January 17, 1956, Serial No. 559,570

8 Claims. (Cl. 340—87)

This invention relates to lighting systems and more particularly, it relates to an improved lighting system for an automotive vehicle.

The present day systems of vehicle lighting employ a number of different lamps on both the front and the rear of the vehicle. In general, these lamps may be classified as either vehicle operating lamps or warning signal lamps. For example, in the rear lamp system of a vehicle, the tail lamps, the back-up lamps and the license plate lamps may be considered as operating lamps. Additionally, the vehicle is provided with stop or brake lamps, turn or directional lamps which are used as signal lamps to warn operators of other vehicles and pedestrians of an impending maneuver of the vehicle.

Heretofore, it has been a common practice to employ separate lamps on the vehicle for the different lighting functions, each lamp being provided with a lamp body, a reflector, a lens, and a light source. In such systems, the lamps are located in spaced relation on the vehicle body. This arrangement requires numerous body openings which, of course, increase costs of body fabrication and assembly. Additionally there is required an elaborate electrical wiring system for energizing the lamps which also contributes to high cost and presents a maintenance problem. In such previous lamp systems, the lamps serve no other function than lighting, and the spaced relationship does not permit single components of the lamp system to perform multiple functions. Also, each lamp is positioned on the vehicle body in such manner that the lens is exposed to view and to accidental damage. The foregoing structural features of the present-day vehicle lighting systems inhibit freedom of body styling, and to a considerable extent, the vehicle lighting has dictated the body styling of the vehicle.

In previous systems of vehicle lighting, the turn signal is commonly produced by a single, intermittently energized lamp located on the vehicle body in a position indicative of the direction of the intended maneuver of the vehicle. Commonly, such turn signal lamps are located adjacent or are a part of another lamp of the vehicle such as the tail lamp. As a result, the turn signal may be obscured by energization of the other lamp or if the intensity of the turn signal lamp is great, it is objectionable to operators of the vehicles. Desirably, the turn signals should provide an unmistakable indication of the impending maneuver without interference by or to other lamps and without producing objectionable lighting effects.

Accordingly, it is an object of this invention to provide an improved vehicle lamp of unitary construction which performs multiple lighting functions.

A further object of the invention is to provide a vehicle rear lamp structure incorporated into the vehicle body in such manner that it serves as a structural member thereof.

An additional object of the invention is to provide an improved lighting system which permits the utmost freedom in vehicle body styling.

A further object of the invention is to provide a vehicle lighting system in which the operating and warning lamps produce indirect illumination only and have lenses concealed from view and protected from damage.

A further object of the invention is to provide an improved turn signal system for an automotive vehicle which provides an unmistakable indication of the impending maneuver by a moving arrow or beam of light on the vehicle body.

An additional object of the invention is to provide an improved control circuit for turn signal lamps of an automotive vehicle.

A further object of the invention is to provide a vehicle lighting system in which a single light source and a single reflector are adapted to perform functions of two different vehicle lamps.

In the accomplishment of these objects, there is provided a vehicle body panel member having a concave reflecting surface within which is disposed a lamp body. The lamp body may be provided with lenses adjacent the reflecting surface and encloses plural light sources which may be energized selectively to perform different lighting functions. The light impinges upon the reflecting surface and is redirected away from the vehicle body. The lamp body includes a movable light shield coacting with a light source and different lenses for providing different lighting functions. The lamp body also includes oppositely extending portions each enclosing plural light sources which are sequentially energized to produce a moving arrow of light on the reflecting surface of the body panel member to signify the direction of an impending vehicle maneuver.

A more complete understanding of the invention may be had from the detailed description which follows taken with the accompanying drawings in which:

Figure 3 is a top plan view in partial section of the vehicle lamp system;

Figure 4 is a rear elevation in partial section of the lamp system;

Figure 5 is a diagram of the electrical circuit for the lamp system; and

Figure 1:
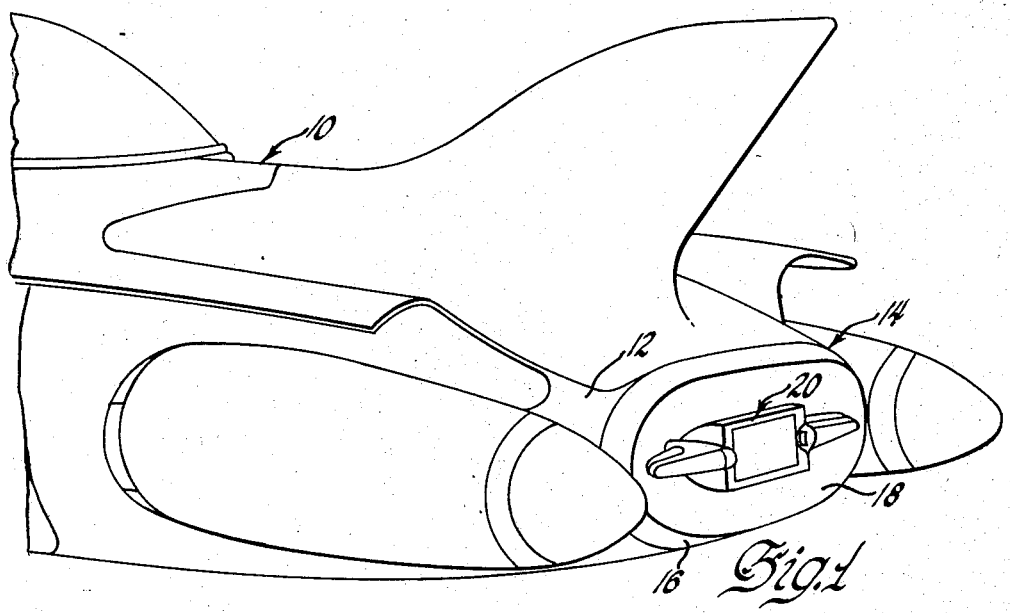
Figure 1 is a perspective view of the inventive lamp system installed on an automotive vehicle.

Referring now to the drawings, there is shown an illustrative embodiment of the invention in a rear lamp system for an automotive vehicle. Figure 1 illustrates a typical installation in a vehicle body 10 which includes a body shell member 12 terminating at its rearmost extremity in a laterally elongated opening of ovoid shape. The vehicle body member 12, which constitutes the main body shell, has an axis of symmetry about the longitudinal axis of the vehicle. Disposed within and closing the axial opening in the body shell 12 is the lamp assembly, designated generally at 14. The lamp assembly comprises a body panel member 16 secured to the member 12. The member 16 is laterally elongated and provided with a concave light reflective surface 18, preferably of paraboidal curvature in cross section. The lamp assembly 14 also includes a lamp body, designated generally at 20, which is secured to and disposed within the confines of the concave surface 18.

Figure 2:
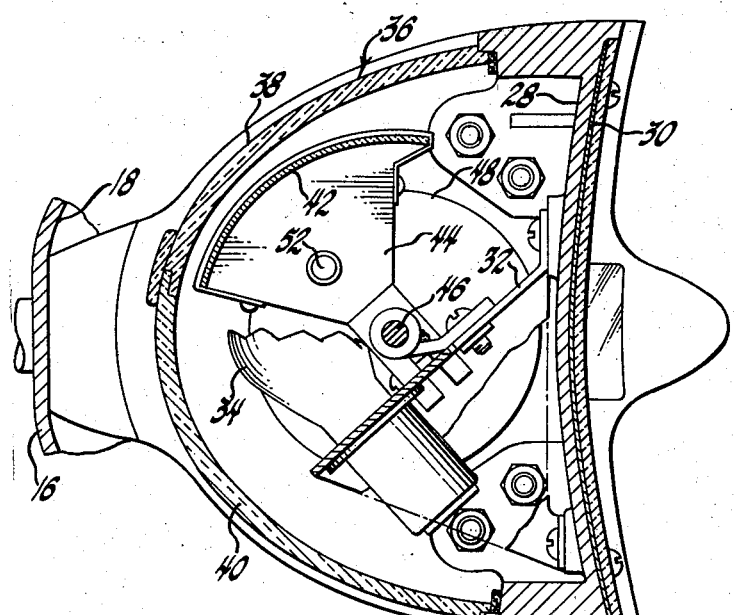
Figure 2 is a cross sectional view of the central section of the lamp body taken on lines 2—2 of Figure 4.

In Figures 2, 3, and 4, the lamp assembly is shown in greater detail. The lamp body 20 is laterally elongated, substantially coextensive with the reflective surface 18, and is mounted in spaced relation thereto by a pair of spaced bosses 17 and 19. The lamp body is secured to the panel member 16 by the support members 21 and 23 which extend through the bosses 17 and 19, respectively. The lamp body includes a central portion 22 and a pair of oppositely extending wing portions 24 and 26.

The central portion of the lamp body and reflecting surface are adapted to produce the stop signal light and back-up light for the vehicle. The central portion of the lamp body 22 includes rear wall 28 which is suitably a flat vertical surface and of suitable dimensions to accommodate a license plate 30 secured thereto. Within the central portion 22 is mounted a lamp support bracket 32 upon which is disposed, in laterally spaced relation, a set of light sources or bulbs 34. A lens 36 adjacent reflective surface 18 is secured to the central portion of the lamp body and encloses the bulbs 34. As shown in Figure 2, the lens 36 is of two-part construction having an upper clear portion 38 which transmits white light. The lower portion 40 is adapted to transmit colored light, preferably red light. The set of bulbs 34 is adapted to provide either back-up light or stop signal light by selective positioning of a movable light shield 42. The light shield 42 is also adapted to transmit colored light, preferably red, and is suitably arcuate in cross-section and substantially coextensive laterally with the lens 36. The shield 42 is mounted upon a pair of movable shield arms 44 disposed at opposite ends thereof. The arms 44 are mounted for rotation with a shaft 46 which is supported by a pair of trunnions at opposite ends of the bracket 32. Displacement of the movable shield 42 is provided by an actuator 48 mounted on a partition of the lamp body in alignment with the shaft 46. The actuator includes an armature 50 having an eccentric pin 52 which engages the shield arm 44 which is secured to the shaft 46. The actuator 48 may be a conventional rotary solenoid having an energizing winding and return spring for displacing the armature. In its normal position, the light shield 42 is aligned with the clear portion 38 of the lens 36. In this position, the light rays emitted from the bulbs 34 are transmitted through the red light shield 42 and the clear lens portion 38 to the reflective surface 18. Also the light rays are transmitted from the bulbs 34 through the red lens portion 40 to the reflector surface 18. Thus, only red light impinges upon the reflective surface 18 to provide stop signal illumination thereof. When the light shield 42 is aligned with the red lens portion 40, the intensity of the light transmitted thereby is small and produces negligible illumination of reflective surface 18. However, the white light transmitted through the clear lens portion 38 illuminates the reflective surface brilliantly and is effective to provide back-up illumination of the roadway. Circuit means for automatic actuation of the light shield 42 simultaneously with the energization of the lamps 34 will be described subsequently.

In order to provide illumination of the license plate 30, the lamp system includes a pair of license lamps 56 and 56' disposed on opposite sides of the central portion 22 of lamp body 20. As shown in Figure 3, the license lamp 56 includes a bulb 58 secured to the lamp body 20 by a suitable mounting bracket. A license lamp lens 62 is mounted in the lamp body 20 and directs the light from the bulb 58 in a lateral direction to provide an edge lighting effect of the license plate 30. The license lamp 56' is identical in construction to that of the license lamp 56.

The lamp assembly includes provision for right and left hand tail lights to mark the rear extremity of the vehicle for night-time operation. The tail light is provided by a pair of bulbs 64R and 64L which are suitably of the two filament type and include the filaments 68R and 68L, respectively. The right-hand tail light is provided by bulb 64R mounted in wing portion 24 of the lamp body 20 on a support bracket 72. A lens 82 is secured to the wing portion 24 of the lamp body 20 in sealed relation thereto and adjacent the reflecting surface 18. The left-hand tail light is provided in a similar manner by bulb 64L in the wing portion 26 which supports lens 84 adjacent reflecting surface 18. The lenses 84 and 82 are coextensive with the wing portions 26 and 24 and are adapted to transmit colored light, such as red, for transmitting the stop light and the turn signal light which will be described presently.

The lamp assembly provides for turn or directional signal lights in the wing portions 24 and 26. The right-hand wing portion 24 of the lamp body 20 includes single filament bulbs 74R, 76R, and 78R which, with filament 80R of bulbs 64R, provide the right-hand directional signal. In the same manner, left-hand wing portion 26 includes bulbs 74L, 76L, and 78L which, with filament 80L of bulb 64L, provide the left-hand directional signal. In a manner to be described in detail hereinafter, the right-hand turn signal lamps and the left-hand turn signal lamps are energized selectively in accordance with the impending maneuver of the vehicle and the lights within each group are energized one at a time in rapid sequence which is repetitive for a predetermined time interval to produce the illusion of a moving beam or arrow of light. This light is transmitted from the light sources or bulbs through the respective lenses 82 or 84 to the reflective surface 18. The light is redirected by the reflective surface 18 rearwardly of the vehicle to produce an unmistakable warning signal indicative of the impending turn. The electrical conductors or wiring for energizing the lamps just described extend into the lamp body through the support members 21 and 23. As shown in Figure 3, these conductors, indicated at 90, then extend to the various lamps for energization thereof.

The circuit arrangement for energizing the aforementioned lamps and the actuator 48 is shown in Figure 5. This circuit includes the vehicle battery 92 having its negative terminal connected to ground 94 and its positive terminal connected through a conductor 96 to a manually actuable light switch 98, suitably the headlamp switch of the vehicle. The switch 98 is connected through the conductor 100 to the tail lamp filament 68L which is connected through the conductor 103 to ground 105. The conductor 100 is also connected to the conductors 102, 104; to the tail lamp filament 68R and thence through conductor 106 to ground 108. The license lamp filaments 58R and 58L are connected between the conductor 102 and ground 110. The stop signal and back-up bulbs 34 in the central portion of the lamp body are connected in parallel with each other and in series between the conductor 96 and ground 114 with a vehicle brake actuated switch 112. Connected in parallel with the brake switch 112 is a drive selector actuated switch 116 which is interconnected by a linkage 118 with a drive selector switch 116'. The energizing coil 48' for the rotary solenoid 48 is connected between the conductor 96 and ground 120 in series with the drive selector switch 116'.

Before proceeding further with the description of the invention, it will be helpful to consider the operation of the system thus far described. When the switch 98 is closed, the tail lamp filaments 68L and 68R are energized from the battery 92 through the circuit extending from the positive terminal of the battery through the switch 98, conductor 100, and thence through filament 68L and conductor 103 to ground 105. The filament 68R is energized through the same circuit and through the conductor 102, conductor 104 and thence through filament 68R to ground 108. Simultaneously, the license lamps 58R and 58L are energized from the battery 92 through the switch 98, conductor 100 and thence through the filaments in parallel to ground 110. With the vehicle in operation, the brake switch 112, actuated by movement of the vehicle brake pedal, closes the circuit from conductor 96 through the filaments of lamps 34 in parallel to ground 114. The light produced by the lamps 34 is transmitted through the lens portion 40 and the movable lens 42 and all the light striking the reflector 18 is colored, preferably red, providing a reflected brake or stop light signal of broad area throughout the central section of the reflector 18. When the drive selector or back-up switches 116 and 116' are closed by actuation of the vehicle drive selector, a circuit is completed from the conductor 96 through the solenoid energizing coil 48' to ground 120. Energization of the solenoid 48 causes the movable shield 42 to be displaced into alignment with the red lens portion 40. Therefore, light from the bulbs 34 is transmitted through the clear lens portion 38 to the reflector 18. This light is redirected by the reflector to provide illumination of the roadway behind the vehicle.

Figure 6:
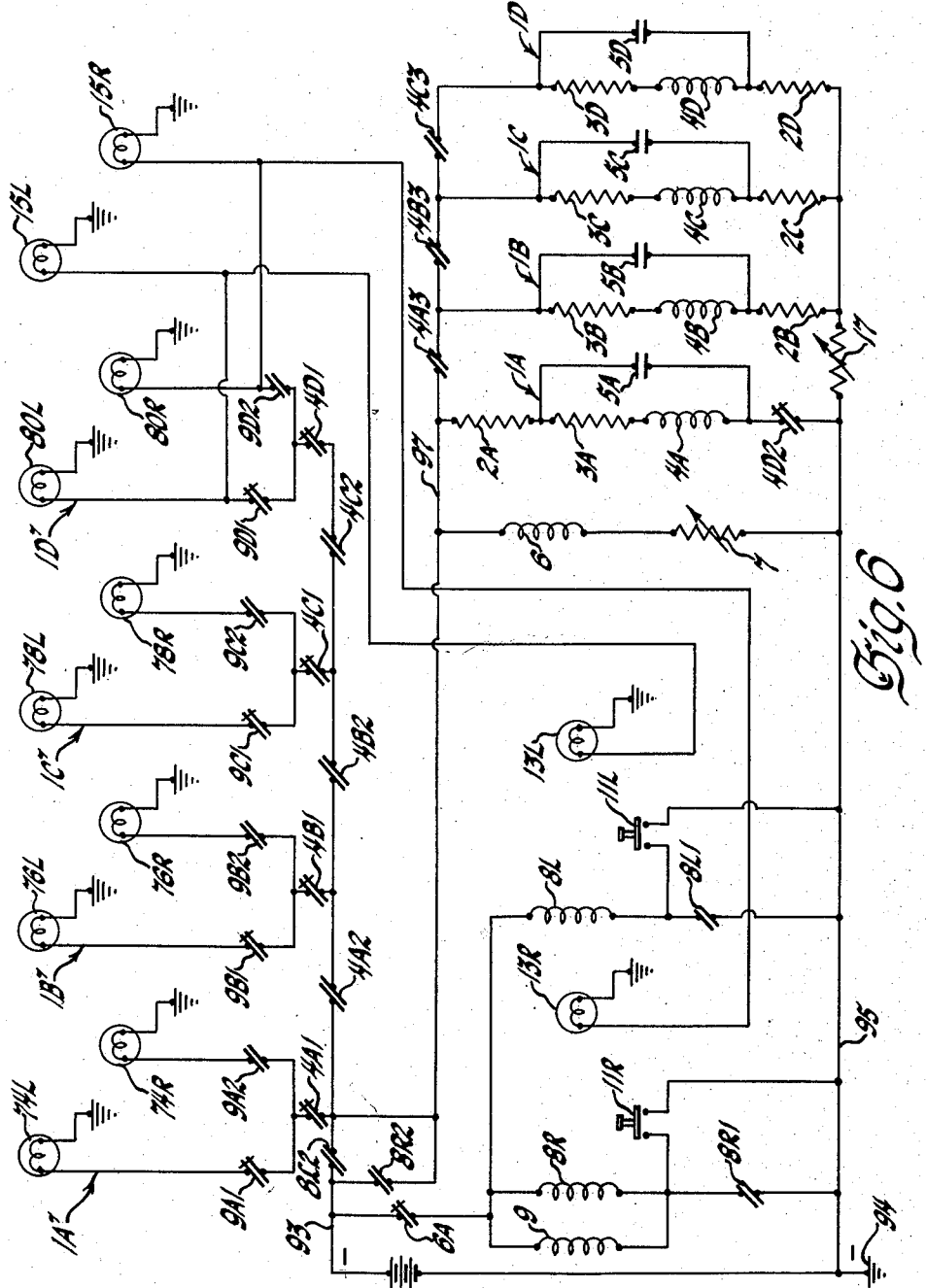
Figure 6 is a diagram of the control circuit for the turn signal lamps.

An additional feature of this invention resides in the directional or turn signals for providing a beam or arrow of light which appears to move in the direction of the intended turn of the vehicle. This effect is produced by energizing light sources in sequence one at a time in repetitive cycles of operation. The control circuit for accomplishing this is shown in Figure 6.

The control circuit is suitably energized from the vehicle battery 92 having its negative terminal connected to ground 94 and to the common conductor 95 and the positive terminal connected to the conductor 93. Plural lamp circuits, designated generally at 1A', 1B', 1C', and 1D' are provided which include the left-hand group of lamps 74L, 76L, 78L, and 80L, and the right-hand group of lamps 74R, 76R, 78R, and 80R, respectively. The lamp circuits, connected between the conductor 93 and ground, will be described in greater detail subsequently. Corresponding to each of the lamp circuits 1A', 1B', 1C', and 1D', there is provided a lamp control circuit 1A, 1B, 1C, and 1D, respectively. The lamp control circuits extend between the conductor 87 and the common ground conductor 95. The lamp control circuit 1A includes in series connection the resistors 2A and 3A, the energizing coil of a relay 4A, and the normally closed relay or contacts 4D2. A condenser 5A is connected in parallel across the resistor 3A and the energizing coil of relay 4A. Similarly, the lamp control circuit 1B includes resistors 2B and 3B, and the energizing coil of the relay 4B. A condenser 5B is connected in parallel with resistor 3B and coil 4B. The lamp control circuits 1C and 1D include circuitry identical to that of 1B and corresponding elements are designated by the same reference character having a suffix to identify it with the particular lamp control circuit. A variable resistor 17 is connected between resistors 2B, 2C, and 2D and ground 94 for adjustment of the frequency of operation of the lamp control circuits.

The lamp circuit 1A' is connected to the conductor 93 by normally closed relay lamp switch contacts 4A1 which are actuated by the relay 4A. Similarly, the lamp circuits 1B', 1C', and 1D' are connected with the conductor 93 through relay contacts 4B1, 4C1, 4D1 which are actuated by the relays 4B, 4C, and 4D, respectively. The lamp control circuits 1A, 1B, 1C, and 1D are connected in cascade relation, one to another, through the sequence contacts 4A3, 4B3, and 4C3 which are actuable by the respective relays 4A, 4B and 4C. Similarly, the lamp circuits 1A', 1B', 1C', and 1D' are connected in cascade relation through the sequence contacts 4A2, 4B2, and 4C2. Thus, it will be apparent that the energization of each of the aforementioned relays is effective to open the normally closed lamp switch and to close the normally open sequence switch of the succeeding lamp circuit and lamp control circuit.

The energization of the lamp control circuits is controlled by either of a pair of selector circuits both of which are connected between the conductors 93 and 95 through normally closed contacts 6A. The selector circuit for the left-hand lamps includes the energizing coil of relay 8L and the switch 11L, suitably of the push-button type. Connected in parallel with the switch 11L are the holding contacts 8L1 actuated by relay 8L. The selector circuit for the right-hand lamps includes the parallel connected energizing coils of relays 8R and 9 in series with the selector switch 11R. Connected in parallel with the switch 11R are the holding contacts 8R1 actuated by the relay 8R. The conductor 97 for energizing the lamp control circuits is connected with the conductor 93 through the parallel connected set of contacts 8L2 and 8R2, which are actuated by the relays 8L and 8R, respectively. Therefore, when the left-hand selector switch 11L is closed, the relay 8L is energized and the normally open contacts 8L2 are closed to energize the conductor 97. Similarly, when the right-hand selector switch 11R is closed, the relay 8R is energized and the normally open relay contacts 8R2 are closed to energize the conductor 97. Selection of the right or left-hand group of lamps for energization is also effected by the selector switches 11R and 11L. For this purpose, each branch of each of the lamp circuits 1A', 1B', 1C' and 1D' is provided with relay contacts. The left-hand group of lamps 74L, 76L, 78L, and 80L are serially connected with the normally closed contacts 9A1, 9B1, 9C1, and 9D1, respectively. In the same manner the right-hand group of lamps 74R, 76R, 78R, and 80R are serially connected with the normally open contacts 9A2, 9B2, 9C2, and 9D2, respectively, which are actuated by the relay 9.

In order to apprise the operator of the vehicle that the turn signal lamps are in operation, there is provided a pair of pilot lamps 13L and 13R. The lamp 13L is connected in parallel with the final left-hand lamp 80L for energization simultaneously therewith. Similarly, the pilot lamp 13R is connected in parallel with the final right-hand lamp 80R for energization therewith. The subject circuit may also be used to provide turn signal indication for the front of the vehicle, if desired. This may be accomplished by connecting the front left-hand lamp 15L in parallel with one of the rear left-hand lamps 80L for simultaneous energization. In the same manner, the front right-hand lamp 15R may be connected in parallel with the rear right-hand lamp 80R. It will be apparent that the two lamps 15L and 15R on the front of the vehicle are intermittently energized to produce turn signal light.

In order to limit the signaling interval or duration, there is provided a master time delay relay 6 having its energizing coil serially connected with variable resistor 7 between the conductor 97 and the conductor 95. The time delay relay 6 actuates the normally closed time delay relay contacts 6A which are connected in series with the selector circuits. The time delay interval of the relay 6 may be adjusted by variation of the resistor 7. Preferably the time delay or time period of operation for each signaling interval is in the range of ten to twenty seconds. At the end of this interval, relay 6 is effective to open the contacts 6A momentarily. The contacts 6A are immediately reclosed in preparation for a subsequent operation.

The operation of the directional signal system may be best understood by a consideration of the cycle of operation for signaling a left-hand turn and a right-hand turn. To signal a left-hand turn, the selector switch 11L is closed. This energizes relay 8L which in turn closes the holding contacts 8L1 and normally open contacts 8L2 energizing the conductor 97, the control circuit 1A, and simultaneously the lamp circuit 1A'. The lamp 74L is energized from conductor 97 through the normally closed contacts 4A1 and the normally closed contacts 9A1. The relay 4A is operative as a time delay relay and therefore does not actuate its associated contacts immediately upon energization. The voltage across the energizing coil of relay 4A is insufficient to actuate the relay until the condenser 5A is charged to a predetermined voltage. The time interval required for the condenser to accumulate such charge depends upon the time constant circuit including the resistor 2A and the condenser 5A. When the predetermined voltage is reached the relay 4A is actuated causing the normally closed contacts 4A1 to open which deenergizes the lamp circuit 1A' and the lamp 74L is turned off. Simultaneously, the relay 4A closes the normally open contacts 4A2 energizing the lamp circuit 1B' and lamp 76L is energized through normally closed contacts 4B1 and 9B1. At the same time, the relay 4A closes the normally open contacts 4A3 energizing the succeeding lamp control circuit 1B. The control circuit 1B operates in the same manner as circuit 1A to provide a predetermined time delay. The time delay interval is determined by the time constant circuit including the condenser 5B, resistor 2B, and the variable resistor 17. When the relay 4B is actuated the normally closed contacts 4B1 are opened and the lamp 76L is extinguished. At the same time, the sequence switch 4B2 is closed and the succeeding lamp circuit 1C' and lamp 78L is energized through the normally closed contacts 4C1. Simultaneously, the actuation of relay 4B closes the normally open contacts 4B3 which energizes the succeeding control circuit 1C. The control circuit 1C operates in the same manner as circuit 1B and after a predetermined time delay the relay 4C is actuated. This causes the contacts 4C1 to open, de-energizing the lamp 78L. At the same time, the normally open contacts 4C2 are closed and the lamps 80L, 15L and 13L are energized through the normally closed contacts 4D1 and 9B1. Simultaneously, the normally open contacts 4C3 are closed and the lamp control circuit 1D is energized. After a predetermined time delay, the relay 4D is actuated which opens the normally closed contacts 4D1 to de-energize the lamps 80L, 15L and 13L. At the same time, the normally closed contacts 4D2 are opened to de-energize the control circuit 1A and the relay 4A. This causes the contacts 4A1 to reclose and causes the contacts 4A2 and 4A3 to open which de-energizes all of the control circuits 1B, 1C, and 1D. Simultaneously, de-energization of relay 4A permits the normally closed contacts 4A1 to reclose and the lamp circuit 1A' is energized, thereby initiating the next cycle of sequential energization of the left-hand lamps 74L, 76L, 78L, and 80L. The sequential energization of these lamps continues for a predetermined signaling interval determined by the time delay relay 6. At the initiation of the signaling interval, closing of the left-hand selector switch 11L energizes the time delay relay winding 6 through the contacts 8L2. As described previously, the time delay relay 6 is operative after a predetermined time interval, following energization to open the normally closed contacts 6A. Therefore, at the end of the signaling interval the contacts 6A are opened and the relay 8L is de-energized. The contacts 6A are immediately reclosed for subsequent operation. De-energization of the relay 8L causes the holding contacts 8L1 to open and the contacts 8L2 to open de-energizing the lamp circuits and the lamp control circuits. The system is now in condition for a succeeding signaling operation.

In the manner just described, the left-hand group of lamps 74L, 76L, 78L and 80L are energized sequentially in the order named and one at a time. The light therefrom is transmitted through the lens 84 to the reflector 18. The reflected light is directed rearwardly of the vehicle and because of the rapid sequential energization of the lamps appears to an observer as a beam or arrow of light moving repetitively over the same path in the direction of the impending vehicle turn. Thus, an unmistakable directional signal is provided.

When the right-hand selector switch 11R is closed, both the relays 8R and 9 are energized. The relay 9 actuates the normally closed lamp selector switches 9A1, 9B1, 9C1 and 9D1 to the open position. It also causes the normally open switches 9A2, 9B2, 9C2, and 9D2 to be closed. The relay 8R causes the holding contacts 8R1 to be closed to establish a holding circuit through the relays 8R and 9. At the same time, the normally open relay contacts 8R2 are closed completing the energizing circuit from the battery 92 to the signal lamp control circuits through conductor 97. Thus, the signal lamp circuit 1A' is energized through normally closed contacts 4A1 and lamp 74R is energized through contacts 9A2. After predetermined time delay, in the same manner as described previously, the relay 4A is actuated causing the contacts 4A1 to be opened, de-energizing the right-hand signal lamp 74R. At the same time, the normally open sequence contacts 4A2 are closed completing an energizing circuit for the signal lamp 76R through contacts 4B1 and contacts 9B2. Simultaneously, the sequence contacts 4A3 are closed energizing the succeeding control circuit 1B. Relay 4B is actuated, with time delay, and the normally closed contacts 4B1 are opened de-energizing the signal lamp 76R. At the same time the normally open sequence contacts 4B2 are closed energizing the signal lamp 78R through contacts 4C1 and 9C2. Simultaneously, the normally open contacts 4B3 are closed energizing the control circuit 1C. After the predetermined time delay, relay 4C is actuated causing normally closed contacts 4C1 to be opened and de-energizing signal lamp 78R. At the same time, the normally open sequence contacts 4C2 are closed energizing the lamps 80R, 15R, and 13R through the contacts 4D1 and 9D2. Simultaneously, the normally open sequence contacts 4C3 are closed energizing the control circuit 1D. Following a predetermined time delay, relay 4D is actuated causing the normally closed contacts 4D1 to open de-energizing the lamps 80R, 15R, and 13R. At the same time the normally closed contacts 4D2 are opened de-energizing the relays 4A, 4B, 4C, and 4D. This causes the associated contacts 4A1, 4B1, 4C1, and 4D1 to be closed and the associated sequence switches 4A2, 4B2, and 4C2, and 4A3, 4B3, and 4C3 to be opened. Thus, the right-hand signal lamp 74R is energized and the next cycle of operation is initiated. After a predetermined number of cycles corresponding to the time delay of the master time delay relay 6, the normally closed contacts 6A are opened momentarily de-energizing the relay winding 8R and 9. De-energization of the relay winding 9 causes the contacts 9A1, 9B1, 9C1, and 9D1 to be reclosed. De-energization of the relay 8R causes the holding contacts 8R1 to be opened and causes the contacts 8R2 to be opened which de-energizes all of the circuits in the control system. The system is thus returned to its normal condition and is prepared for subsequent operation for indication of left-hand turn or right-hand turn.

Although the description of this invention has been given with respect to a particular embodiment, it is not to be construed in a limiting sense upon the scope of the invention. Many variations and modifications within the spirit and scope of the invention will now occur to those skilled in the art. For a definition of the invention, reference is made to the appended claims.

We claim:

1. In combination, an automotive vehicle body including a body shell member having an axis of symmetry extending longitudinally of the vehicle body, said shell member terminating in a laterally elongated axial opening, a structural body member disposed in and closing the opening and including a laterally elongated, concave optical reflector, a unitary laterally elongated lamp body disposed within the confines of said reflector, plural light sources supported by the lamp body in a laterally extending array, lens means mounted on the lamp body and interposed between the light sources and the reflector, and means for selectively energizing the light sources whereby different lateral portions of the reflector are illuminated corresponding to the selected source and the reflected light rays appear to be emanating from the structural body member.

2. In combination, an automotive vehicle body including a body panel member terminating in an elongated axial opening, a body member disposed in and closing said opening and including an elongated optical reflector and a peripheral rim protruding axially beyond the body panel member, a unitary elongated lamp body disposed within the confines of the reflector, plural light sources supported by the lamp body in an elongated array, lens means mounted on the lamp body and interposed between the light sources and the reflector, and means for selectively energizing the light sources whereby different portions of the reflector are illuminated corresponding to the selected light source.

3. A lighting system for an automotive vehicle comprising a concave body panel of parabolic configuration in one plane and of an extended straight configuration in a perpendicular plane and having a light reflecting surface, a lamp including an opaque lamp body and lens enclosing a light source mounted in spaced relation to the body panel within the confines thereof, said light source being located at the focal point of the parabolic configuration and said lens being disposed intermediate the body panel and the lamp body whereby the light source and lens are concealed from view and only reflected light emanates from the lighting system.

4. In combination, an automotive vehicle body including a body member having an axis of symmetry extending longitudinally of the vehicle body, said shell member terminating in a laterally elongated opening, a body panel having a light reflecting surface disposed in said opening, an opaque, laterally elongated lamp body mounted adjacent said body panel, plural warning signal light sources supported adjacent the reflecting surface by the lamp body in laterally spaced relation, and means for selectively energizing the light sources whereby different lateral portions of the body panel member are illuminated corresponding to the location of the selected source and the reflected light rays appear to emanate from the body panel member.

5. In combination, an automotive vehicle body including a body member having an axis of symmetry extending longitudinally of the vehicle body, a laterally elongated light reflecting member mounted symmetrically on the body member at one axial extremity thereof, an opaque, laterally elongated lamp body mounted in axially spaced relation to the light reflecting member, plural warning signal light sources supported adjacent the reflecting member by the lamp body in laterally spaced relation, and means for selectively energizing the light sources whereby different lateral portions of the reflecting member are illuminated in accordance with the position of the light source selected.

6. In combination, an automotive vehicle body including a body member having an axis of symmetry extending longitudinally of the vehicle body, a laterally elongated concave light reflecting member mounted symmetrically on the body member at one axial extremity thereof, a laterally elongated lamp body mounted in spaced relation within the confines of the concave reflecting member and including a central portion and oppositely extending wing portions, a turn signal light source disposed in each of said wing portions, and a light source disposed in the central portion between the lamp body and the reflecting member, the central portion of the lamp body being adapted to receive a vehicle license plate on its axial surface.

7. A turn signal system for an automotive vehicle comprising an automotive vehicle body including a body member having an axis of symmetry extending longitudinally of the vehicle body, a laterally elongated concave light reflecting member mounted symmetrically on the body member at one axial extremity thereof, a laterally elongated lamp body mounted in axially spaced relation within the confines of the reflecting member and including oppositely extending wing portions, a set of plural light sources disposed in lateral spaced relation between each of said wing portions and the reflecting member, a lens interposed between the reflecting member and the lamp body means for sequentially energizing the light sources of each set selectively whereby reflected light emanates from the reflecting member at laterally adjacent portions successively providing an illusion of a moving beam of light for signaling an impending maneuver of the vehicle.

8. In combination, an automotive vehicle body including a body member having an axis of symmetry extending longitudinally of the vehicle body, a laterally elongated light reflecting member mounted symmetrically on the body member at the rear axial extremity thereof, a laterally elongated lamp body mounted in axially spaced relation to the reflecting member and including a central portion and oppositely extending wing portions, a turn signal light source disposed between each wing portion and the reflecting member, a brake and back-up light source and a lens disposed between the central portion and the reflecting member, said fixed lens including a clear portion for back-up illumination and a colored portion for brake signal light, a movable shield interposed between the light source and reflecting member, actuating means for displacing said movable shield into alignment with the clear portion or the colored portion of the lens, a brake actuated switch and a drive selector actuated switch for energizing the brake and back-up light source respectively, means for energizing the actuating means simultaneously with the actuation of one of said switches, to displace the shield into alignment with the lens portion corresponding to the other of said switches, and means for selectively energizing one of said turn signal light sources whereby turn signal light and brake signal light is reflected from adjacent discrete portions of the reflecting member.

References Cited in the file of this patent

UNITED STATES PATENTS

| 1,065,845 | Sauvage | June 24, 1913 |
| 1,346,567 | Stover | July 13, 1920 |
| 1,655,787 | Harris | Jan. 10, 1928 |
| 1,809,374 | Carter | June 9, 1931 |
| 1,845,111 | Albright | Feb. 16, 1932 |
| 1,873,823 | Cecil | Aug. 23, 1932 |
| 1,901,663 | Minkler | Mar. 14, 1933 |
| 1,970,252 | Rydner | Aug. 14, 1934 |
| 1,998,157 | Fossum | Apr. 16, 1935 |
| 2,114,759 | Barjot | Apr. 19, 1938 |
| 2,179,889 | Hall | Nov. 14, 1939 |
| 2,197,038 | Glocksive | Apr. 16, 1940 |
| 2,223,163 | Boeker | Nov. 26, 1940 |
| 2,302,535 | Durbin | Nov. 17, 1942 |
| 2,355,557 | Boeker | Aug. 8, 1944 |

FOREIGN PATENTS

| 1,080,378 | France | May 26, 1954 |